April 6, 1971    E. B. SCHOONMAKER ET AL    3,574,036
APPARATUS AND METHOD FOR UPDATING INFORMATION FILES
Filed May 2, 1967    3 Sheets-Sheet 1
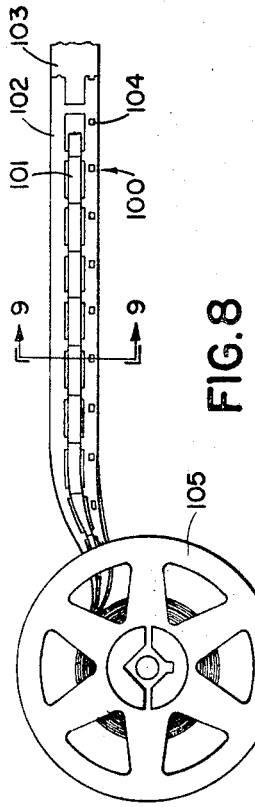
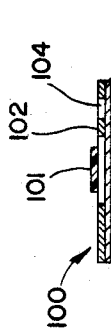
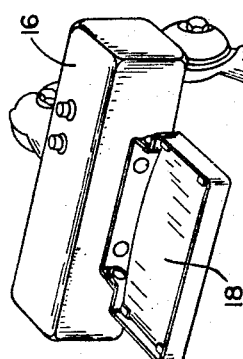
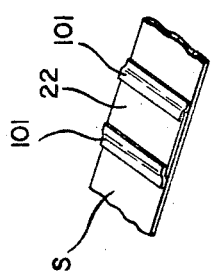
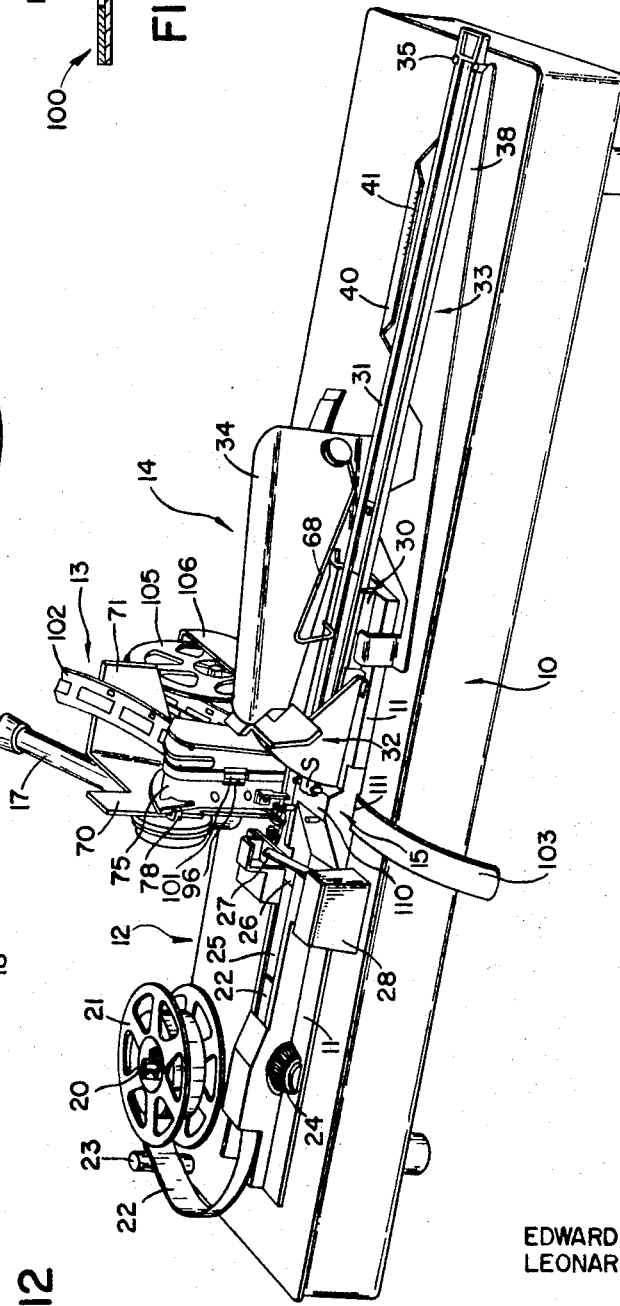
EDWARD B. SCHOONMAKER
LEONARD J. SEABERG
INVENTORS
BY John W. Husser
Robert W. Hampton
ATTORNEYS United States Patent Office 3,574,036
Patented Apr. 6, 1971

3,574,036
APPARATUS AND METHOD FOR UPDATING INFORMATION FILES
Edward B. Schoonmaker and Leonard J. Seaberg, Rochester, N.Y., assignors to Eastman Kodak Company, Rochester, N.Y.
Filed May 2, 1967, Ser. No. 635,414
Int. Cl. G03d 15/04
U.S. Cl. 156—502             9 Claims

ABSTRACT OF THE DISCLOSURE

Apparatus and a method of operation are disclosed for updating a file including at least one strip having a portion for receiving an information-bearing chip. The disclosed apparatus operates to move the portion of the strip to a predetermined location, to dispose a web of the information-bearing chips to the predetermined location, to attach the information-bearing chip to the strip, and to sever the attached information-bearing chip from the web.

CROSS REFERENCE TO RELATED APPLICATIONS

Referene is made to commonly assigned U.S. patent application, Ser. No. 486,725, filed Sept. 13, 1965, to Schoonmaker et al.

BACKGROUND OF THE INVENTION

Field of the invention

The present invention relates to apparatus and procedures for facilitating the updating of information files and more particularly to apparatus and procedures for selectively adding information to an information file comprising at least one, short strip adaptable for storage in or on a so-called "stick-type" holder.

DESCRIPTION OF THE PRIOR ART

Recently in the art of information storage and retrieval, files of one or several strips of information-bearing materials, e.g., microfilm, stored in a so-called "stick-type" holder have been developed to facilitate rapid access to stored information. Examples of one and multiple strip files of this type are respectively disclosed in U.S. Pat. 3,242,802 and U.S. patent application 486,725, filed Sept. 13, 1965, abandoned for streamlined continuation application Ser. No. 708,419, now Pat. No. 3,476,472. Such files have been found particularly advantageous in applications where the information stored must be current, with frequent updating, for a strip or strips in the file can be readily replaced or a new strip added so as to incorporate the updated information. Prior art techniques of updating information files have heretofore provided no teaching of methods of, or apparatus for updating such "strip-type" files without replacing entire file strips or adding new strips to the file.

SUMMARY OF INVENTION

In order to further facilitate updating of such "strip-type" files, it has been found desirable to provide a support portion on a strip or strips within such a file, upon which additional information can be added to the file without the necessity of adding or replacing entire file strips. The present invention is intended to so facilitate the updating of such files and comprises, as one feature thereof, apparatus and procedures for positioning, for information addition, a predetermined support portion of a selected strip in a file of the type described above. One important aspect of this feature of the present invention, comprises means and procedures for selectively separating the predetermined support portion from other strips in the multiple "strip-type" file, and for directing that portion to a location for updating without destroying the integrity of, i.e., completely separating, the file. The present invention, in one aspect, also provides apparatus and procedures for updating such a file by adding an information-bearing chip to the predetermined support portion. This aspect of the present invention provides apparatus and procedures for longitudinally and transversely aligning a strip having a series of discrete information-bearing areas from which chips can be formed with respect to the predetermined support portion of the selected file strip and mechanism for forming and selectively attaching information-bearing chips to the support strip.

It is therefore an object of the present invention to provide apparatus and procedures for selectively updating "strip-type" information files.

Another important object of the present invention is to provide apparatus and procedures for selectively separating from a file of similar superimposed strips, for updating, a predetermined support portion of a strip in the file.

A further object of the present invention is to provide apparatus and procedures for facilitating addition of information-bearing chips to an information file comprised of information-bearing strips of the type described above.

Still another object of the present invention is to provide improved apparatus for facilitating the aligned attachment of a chip to a support strip.

BRIEF DESCRIPTION OF THE DRAWING

These and other objects and advantages will become apparent to those skilled in the art from the following description with reference to the drawings in which like characters denote like parts and wherein:

FIG. 1 is a perspective view of the chip-adding apparatus of the present invention;

FIG. 8 is an elevational view showing the laminated tape and tape reel utilized with the present invention;

FIG. 9 is a cross-section of laminated tape unit of FIG. 8 taken along line 9;

FIG. 12 is a perspective view of a portion of a support strip having a chip added thereto in accordance with one mode of operation of the present invention.

Figure 2:
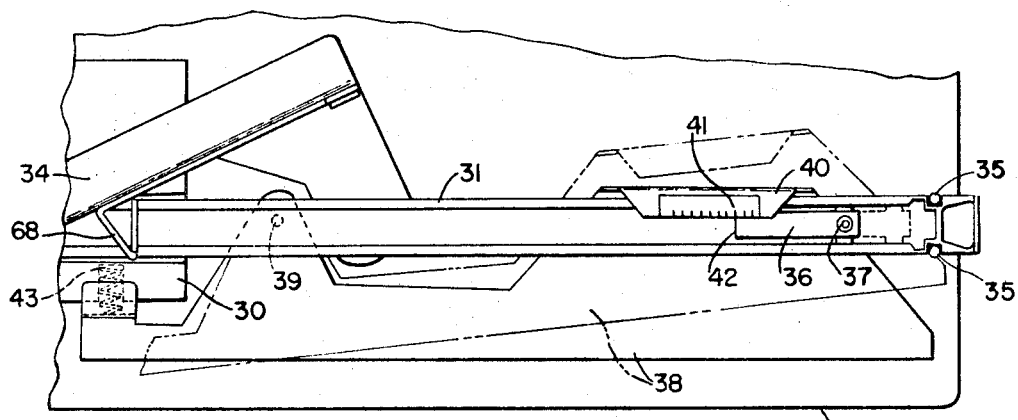
FIGS. 2 and 3 are top views of portions of the apparatus of FIG. 1 showing the file-strip selecting and positioning assembly of the present invention and the withdrawn position of the file.

The term "updating" as used herein refers to the addition of information to a file whether one already having information included therein or one having no prior information.

The term "chip" as used herein refers to separate elements of substantially flat material such as are formed by segmenting a strip but is intended to include elements of similar configuration whether formed by punching, slitting or otherwise.

The present invention is hereinafter described, by way of example, with reference to information files comprised of strips of photographic information-bearing material; however, it will be appreciated by one skilled in the art that the scope of the present invention, in certain aspects, relates to other forms of strips capable of containing information such as, for example, strips of magnetic, thermographic or xerographic materials.

Likewise, the present invention is hereinafter disclosed embodying apparatus for adding information chips as means for updating the support portion of the file; however, certain aspects of the present invention are applicable for updating such files by procedures other than chip addition such as, for example, by photographically recording on a previously unexposed support area, by magnetically recording on a support area of magnetic tape, etc., so that those aspects of the invention should not be interpreted as limited to the chip-addition technique of updating the file.

DESCRIPTION OF PREFERRED EMBODIMENT

By referring to FIG. 1, the various assemblies of the embodiment of the file updating apparatus hereinafter to be described in detail can be seen. The apparatus includes a hollow rectangular base 10 having an elongated opening in the top on which is mounted a support frame 11 suitably constructed to form portions of the four main assemblies of the apparatus, viz., the chip-strip advance and cutting assembly designated generally 12, the splice applicator assembly similarly designated 13, the file-strip selecting and positioning assembly 14 and the chip application station 15. A movable work station lamp 16 is also supported on the base 10 by a jointed support arm 17. A magnifying glass 18 is affixed to the lamp 16 so as to facilitate viewing of the chip-addition operation.

As can be seen in FIG. 1, the chip-strip advance and cutting assembly comprises a spindle 20 upon which a chip-strip reel 21 is rotatably supported so that the chip-strip 22 or discrete, interconnected, information-bearing areas, from which chips are formed, can be fed therefrom. A guide rod 23 directs the chip-strip 22 toward a pair of opposed rollers (not shown) which are housed in a portion of frame 11. A strip-advance knob 24 is connected to one of the rollers so that, when fed into an opening formed in frame 11 at the left of the roller housing (as viewed in FIG. 1) and between the rollers, the strip can be selectively moved in either direction along the chip-strip track 25, which is formed in a top portion of frame 11, by rotating the knob 24. A knife blade 26 is fixed to the support 11 beneath the path of movement of the chip-strip 22 and a movable knife blade 27 is attached on one end to vertically reciprocating actuator 28 so as to extend across that path in cutting relation with respect to the fixed blade 26. The actuator is biased towards an upper position in which the blade 27 is held above the strip path by a spring (not shown) so that pressure applied to the top of the actuator 28 will effect cutting movement of the blade 27 and segment a portion of the chip-strip therebetween to form a chip from the information area selectively advanced therepast.

In FIG. 1 it can also be seen that the file-strip selecting and positioning assembly includes a housing 30 formed in frame 11 for the "stick-type" holder 31. This assembly further comprises a strip separating mechanism 32 (also housed in frame 11), a movable strip-selecting scale 33, a strip deflector 34 and positioning pins 35.

Figure 4:
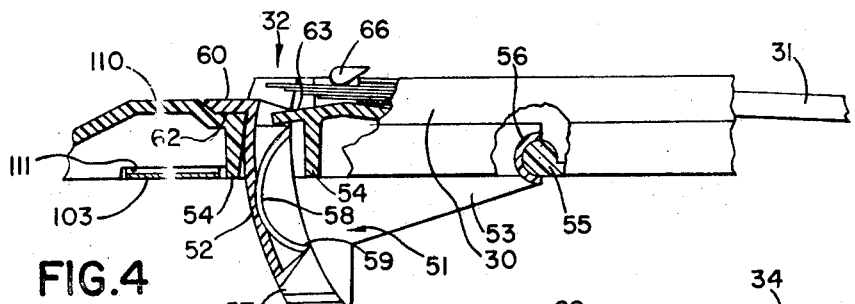
FIGS. 4 and 5 are side views, partially in section of the portion of the apparatus shown in FIG. 3 showing the assembly and the file at different positions during the strip selecting sequence.

As can be seen in FIGS. 1–4 the holder 31 has an open ended channel in which the information-bearing and/or support strips comprising the "strip-type" information file are slidably retained. The strips comprising the information file are superimposed, each strip being attached on one end to the slide member 36 for movement as a unit by means of eyelet 37, and with the opposite strip ends being arranged in an inwardly stepped or shingled array, as shown in FIG. 4. The holder 31 is constructed for insertion into the selecting positioning assembly with the channel top upward, its open end resting in housing 30 and with the opposite end resting between positioning pins 35.

The strip selecting scale 33 comprises an arm portion 38 which is pivotally connected at 39 (see FIG. 2) to the base 10 and which extends beneath the supported position of the holder 31. An upwardly extending lip 40 is formed on the arm 38 in a predetermined relation with respect to the inserted position of holder 31 so that the scale 41 on lip 40 is movable into alignment over the end 42 of slide member 36 when the holder is inserted. The graduations on scale 41 are spaced a distance corresponding to the lengths of the respective exposed portions of the strip ends which form the shingled array. A spring 43 engaging the opposite end of the arm 38 from the scale 41, urges the arm to position indicated by the broken lines in FIG. 2, in which the scale is not aligned over the holder 31.

Figure 5:
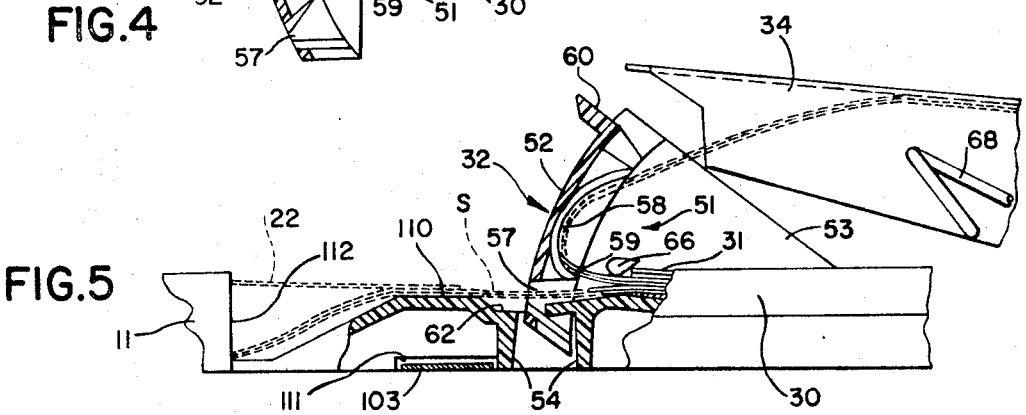

The separating mechanism 32 of the file-strip selecting and positioning assembly can be seen in FIGS. 1 and 3–5 and is used in conjunction with the strip selecting scale 33 to separate and direct, for chip addition, a predetermined support portion of a strip within the strip-type file in holder 31. The separating mechanism 32 comprises a movable member 51 which is substantially U-shaped, having an arcuate base portion 52 with support arms 53 extending from opposite sides thereof. The movable member 51 is supported within a housing 54 in the frame 11 by a pair of bearings 55, also formed on frame 11, each of which pivotally engages a respective end 56 of the support arms 53. The arcuate base portion 52 is formed having a strip aperture 57, a curved, inner guide surface 58 having a lip 59, a support flange 60 and an operating handle 61. The aperture 57 is of sufficient dimension to allow the entire array to pass therethrough and is preferably formed having gradually constricting upper and lower walls as shown in FIGS. 4 and 5. On the outer surface of one of the support arms 53, a detent (not shown) is provided which cooperates with suitable structure provided on frame 11 to releasably support the member 51 when moved to the upper position shown in FIG. 5. The housing 54 is also provided with a recessed surface 62 and lip 63 which cooperate with the movable member 51 to define a substantially smooth path of travel for the strips in either of the positions of member 51 illustrated in FIGS. 4 and 5.

Figure 3:
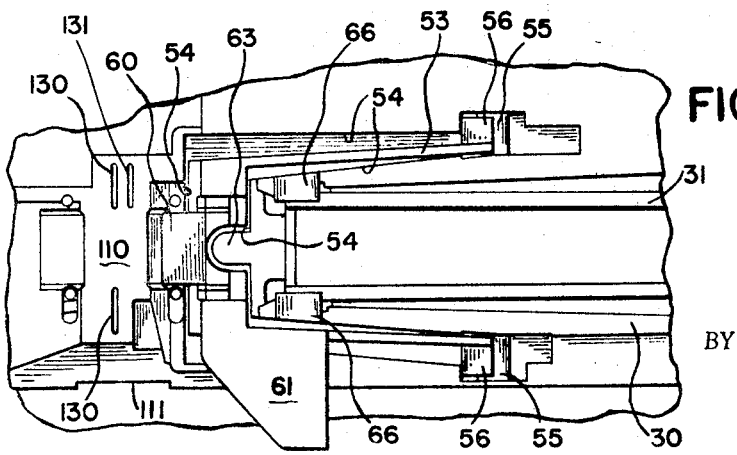

The housing 30 in frame 11 for the open end of holder 31 is shown more clearly in FIGS. 3–5 and has guide members 66 extending from the inner surface thereof to properly position strips which are moved out of the holder with respect to the movable member 51.

The strip deflector 34 is supported above the housing 30 with one end thereof positioned so as to receive and direct rearwardly and to the side, strips passing from the guide surface 58 when the movable member 51 is disposed in the upper position shown in FIG. 5. A movable wire stop 68 is pivotally attached to the deflector 34 and in one position (as shown in FIGS. 1 and 2) is disposed over the open channel of the holder 31 for a purpose hereinafter to be described.

The selecting and positioning assembly is utilized in the following manner to select a particular strip from the "strip-type" file in holder 31 and direct a portion of the selected strip into suitable disposition for the updating operation. The strip selecting operation commences with the movable member 51 of separating mechanism 32 in the down position shown in FIG. 4. The selector arm 38 is then moved so that scale 41 is over the open channel of holder 31 in alignment with the slide 36. The slide 36 is engaged by placing a suitable pointed object in eyelet 37 and moved towards the open end of the channel so that the shingled array of exposed strip ends moves out of the holder. The end 42 of slide 36 is moved to a position aligned directly under the graduation on scale 41 which designates the strip within the file which is selected for chip addition. The scale 41 and movable member 51 of the separating mechanism 32 are relatively positioned so that with the slide 36 so aligned, movement of member 51 to the upper separating position causes the lip 59 to engage and lift all strips in the array which are located above the selected strip in the manner illustrated in FIG. 5. The slide 36 is then moved further towards the open end of holder 31 whereupon the strips of the file above the selected strips are deflected upwardly along surface 58 and into contact with deflector 34 while the remainder of the file passes through aperture 57 with the selected strip on top of the other remaining strips in the file.

In FIGS. 2–5 it can be seen that the third strip of the array (counting downwardly with the top strip in FIG. 4 as the first strip) is selected for chip addition, with the end 42 of slide 36 opposite the third graduation on scale 41. The exposed shingled ends of the array will then be positioned as shown in FIG. 4; and upon upward movement of separator 51, the top two strips are separated from the array so that the top of the selected third strip will be exposed for subsequent updating operations as the remainder of the file, viz., the third and fourth, or more strips, is moved through aperture 57.

After selection of the desired strip, the slide 36 can be moved as desired to dispose a predetermined area of the selected strip in proper positions for updating and the separated strips are directed to deflector 34 as illustrated by the broken lines in FIG. 5. Upon completion of the updating operation, all the strips can be withdrawn into the holder 31 in their same relative positions by merely moving the slide 36 back towards the closed end of the holder.

Figure 7:
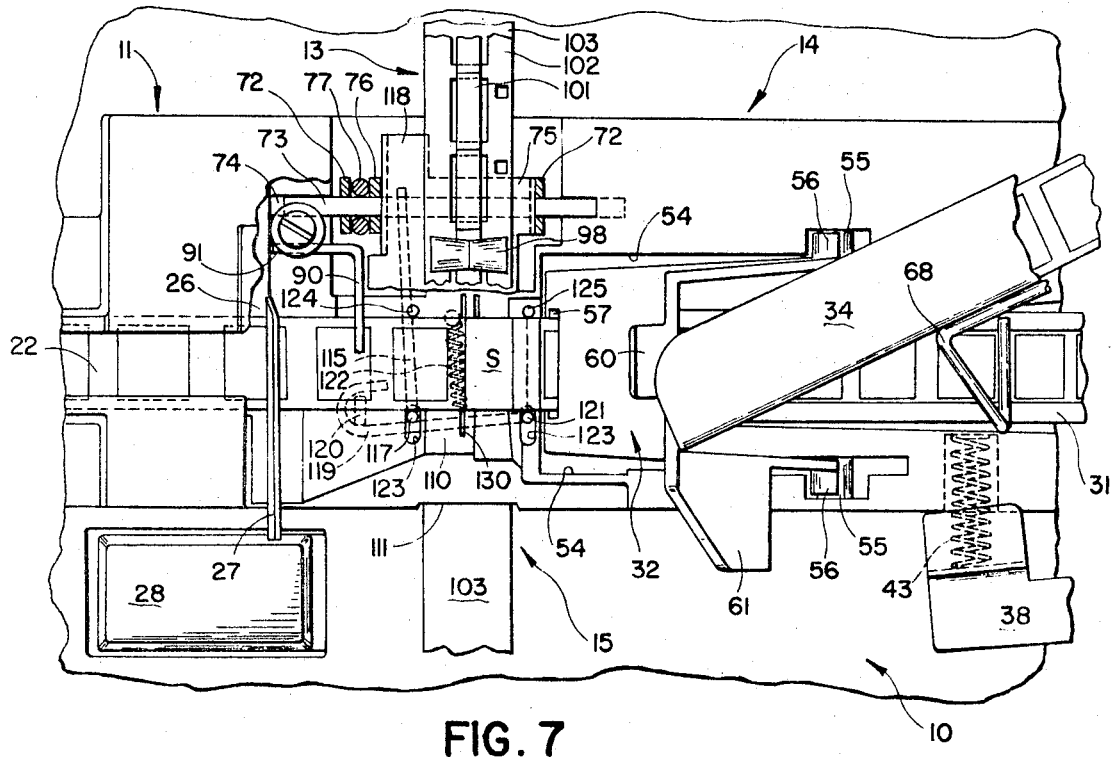
FIG. 7 is a top view of another portion of the apparatus of FIG. 1 showing the chip application station and portions of the splice applicator assembly and file-strip selecting and positioning assemblies.

The splice applicator assembly will now be described with reference to FIGS. 1, 6 and 7. The splice applicator assembly comprises a main housing 70 having opposed side walls and a top wall from which an operating handle 71 extends. Each of the walls is provided with extensions 72 having a hole therein so that the housing can be pivotally mounted on shaft 73 which is supported in bearing recesses 74 formed in frame 11. The shaft 73 also supports an inner housing 75, a sprocket detent arm 76 and detent spring 77 for pivotal movement independent of, and within main housing 70. A stop 79 for arm 76 and applicator arm 80 extend inwardly within the main housing 70 with one end fixed to the top wall thereof. The detent spring 77 is generally U-shaped and extends from the shaft 73 with the arms thereof engaging the top wall of the applicator housing and a portion of the sprocket detent arm 76. The inner housing 75 fits within the open bottom of the main housing and is normally held by a latch member 78 so as to form the bottom wall of the applicator unit as can best be seen in FIG. 1.

A shaft 85 is supported between the walls of the inner housing 75 with a unitary member comprising ratchet-type advance wheel 86 and tape advancing sprocket 87 mounted thereon for rotation. It can be seen that when the inner housing 75 is held within the main housing 70 as shown in FIGS. 1, 6 and 7, the detent roller 88 on the end of the sprocket detent arm 76 is urged into engagement with the advance wheel 86 by spring 77 and that the two sections of the applicator unit, i.e., the inner housing 75 and the main housing 70 are movable with respect to each other against the force of the spring 77. Further, the entire applicator unit is movable on shaft 73 between the splice applying position shown in FIG. 6 and the retracted upper position indicated by the broken lines in FIG. 6.

A sprocket advance pawl 90 is pivotally mounted on one end in a bearing recess 91 in frame 11 which recess is located slightly forward of the bearing recesses 74 so that a bent portion on the opposite end of pawl 90 engages and is movable with the teeth of the advance wheel 86 in a ratchet-type fashion. A spring 94 is connected between the advance pawl 90 and the inner housing 75 so as to urge the movable end of pawl 90 upwardly into engagement with advance wheel 86. Upon movement of the applicator unit to the upper position, the movable end of pawl 90 slips over and behind the lowermost tooth on the advance wheel 86 (as viewed in FIG. 6) and is in position to engage the back portion of that tooth during the next downward movement of the applicator unit to advance the wheel 86 one step. The incremental rotation of wheel 86 in turn rotates sprocket 87 sufficiently far to permit detent roller 88 to complete and stop incremental sprocket advance, and hence, the advance of the splice-carrying tape which is in engagement with the teeth of sprocket 87 by means of perforations formed in the tape.

The applicator arm 80 is provided on its lowermost end with an applicator shoe 95 which is preferably covered with a compliant pad. The shoe 95 is aligned with an aperture 96 in the floor of the inner housing 75 which is of sufficient size to allow the shoe to pass therethrough. A spring 97 is also attached to arm 80 and has, on one end thereof, a roller 98 which, as can be seen in FIG. 6, is urged into contact with the inner wall of housing 75 at a position slightly behind aperture 96 in order to hold the splice-carrying tape passing thereunder against the bottom wall of housing 75.

The laminated tap unit 100 is best shown in FIGS. 8 and 9 and is of the same general type as that disclosed in U.S. Pat. No. 3,194,717. The tape unit 100 comprises a tape 101 which is adhesive on one side and transversely severed to define a series of removable splices, an apertured, splice-carrying tape 102 contiguous with the adhesive surface of tape 101 and an adhesive resistant tape 103 disposed adjacent the opposite surface of tape 102 from tape 101. The splice-carrying tape 102 is also provided with a series of perforations 104 along one edge thereof. The tape 100 is preferably wound on a reel 105 which is rotatably housed in a basket 106 at the rear of the tape applicator unit.

The chip application station 15 will now be described so that the operation of the splice applicator assembly can be explained in conjunction therewith. The chip application station can best be seen in FIGS. 1, 6 and 7 and includes a raised splicing deck 110 formed in frame 11 and located along the aligned paths of the chip-strip 22 and the file-strips from holder 31 which pass through the aperture 57 of the selecting and positioning assembly. The deck 110 is disposed between cutting blades 26, 27 and the separating mechanism 32, and beneath the location of the aperture 96 of the splice applicator unit when that unit is moved to its lower position. The chip application station also includes a passage 111 extending beneath the splicing deck 110 of sufficient width so as to allow passage of tape 103 to pass therethrough. A similar passage 112 is provided beneath track 25 in frame 11 of sufficient size to allow the strips from holder 31 to pass therein as shown in FIG. 5.

Also provided at the chip application station is an L-shaped rod 115 reciprocatingly supported in housing 116 with one leg 117 extending up through frame 11 adjacent the splicing deck 110 and the other leg extending beneath deck 110 to a position opposite lug 118 which extends from the bottom of the inner housing 75 of the tape applicator unit. A rod 119 is also provided beneath the splicing deck and is pivotally supported at one hooked end on pin 120 for movement into contact with the upwardly extending leg 117 of rod 115. The rod 119 is also bent upwardly at its other end and forms a second leg 121 extending through frame 11 as can be seen in FIG. 7. A spring 122 is fastened to rod 119 and to the splicing deck so as to urge the rod towards two fixed aligning pins 124 and 125 which extend upwardly from frame 11 on one side of the superimposed paths of the chip-strip 22 and the strips from holder 31. The legs 117 and 121 extend through slots 123 adjacent the splicing deck which are located along the opposite side of the superimposed paths of the chip-strip and file strips from fixed pins 124 and 125.

It can therefore be seen that when the tape applicator unit is in the upward position, the lug 118 engages and moves rod 115 forward, i.e., away from the fixed pins 124 and 125, against the spring 122 and that the movement of leg 117 of rod 115 will cause rod 119 to pivot on pin 120 against the spring 122 so that leg 121 also moves forward. As the tape applicator unit is moved downward to perform a splicing operation the lug 118 is disengaged from the rod 115 so that the spring 122 can move legs 117 and 121 rearwardly in their slots 123. This rearward movement allows legs 117 and 121 to move against the edges of the superimposed chip-strip and strips from holder 31 so as to align these strips on the splicing deck against fixed pins 124 and 125 for the splicing operation.

Prior to the splicing operation, the laminated tape unit 100 is fed from reel 105 with the tape 103 threaded through passage 111 beneath the splice deck and with tapes 101 and 102 threaded beneath roller 98, around sprocket 87 and out of the inner housing. The teeth of sprocket 87 cooperate with the perforations 104 in carrier tape 102 so as to align the severed splices of tape 101 with respect to the width of superimposed paths of chip-strip 22 and file strips from holder 31 as they are positively registered against fixed pins 24 and 25.

Figure 6:
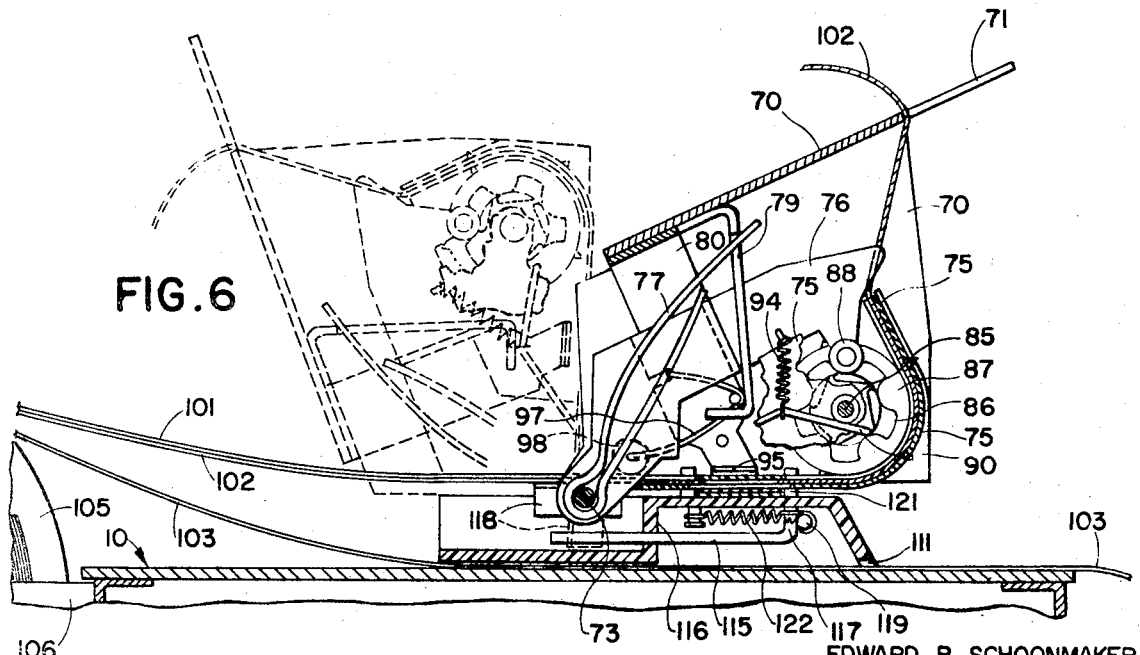
FIG. 6 is a sectional view of the splice applicator assembly of FIG. 1 including a fragmentary portion of the applicator housing and of other operating elements.
Figure 10:
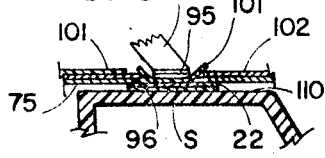
FIGS. 10 and 11 are sectional views of a portion of the tape applicator assembly of FIG. 6 showing the splice application operation.
Figure 11:
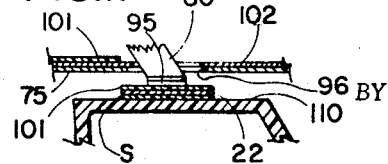

Referring to FIGS. 6, 10 and 11, the splice application will be described commencing with the applicator unit in the upper position indicated by the broken lines in FIG. 6. The applicator unit is moved downwardly by handle 71 and the advance wire 90, wheel 86, sprocket 87 and the carrier tape 102 cooperate in the manner previously described to advance a splice of strip 101 into alignment. The applicator unit comes to a rest position on the advanced chip-strip 22 with the aperture 96, a splice of tape 101 and the applicator shoe 95 aligned over a splicing position on the deck 110 which is preferably indicated by means of notches 130 or other such indicating means adjacent the deck. Further downward movement of the handle 71 causes the outer housing 70 to move against spring 77 so that the shoe 95 on arm 80 forces the splice 101 through the aperture in the carrier-tape 102 and through the aperture 96 in inner housing 75 so as to contact and adhere to the strip portions located in the splicing position on the splice deck 110 as can be seen in FIG. 10. The inner housing 75 can then be raised slightly against spring 77 to free the splice from the tape 102 as shown in FIG. 11. A notch 131 may be provided to indicate the position to which a previously attached chip should be advanced to prevent interference with subsequent chip additions.

Having now described the structure and mode of operation of each of the separate assemblies, a brief description of the manner in which the assemblies cooperates in the overall function of the updating apparatus will serve to further describe the present invention.

When it is desired to add a chip of information to a "strip-type" file of the type herein described, the holder 31 is placed in the selecting and positioning assembly, the desired strip is selected and the file-strips thereabove are deflected from the support portion of the selected strip S in the manner described above. The selected strip S is then adavnced over the splicing deck until the desired support portion for chip addition is aligned with respect to one of the positioning notches 130. The leading ends of the file-strips can pass into passage 112 in the manner shown in FIG. 5 if so required in order to position the desired support portion on the splice deck. The wire 68 serves to limit movement of the object engaging slide 36 in order to indicate the furthemost extension of the file-strips on which a complete strip addition is desirable.

With the support portion of the selected strip S so positioned, the chip-strip 22 is next advanced over the top of the support strip in the manner previously described and likewise positioned with respect to notches 130. Cutting blades 26, 27 can be used to effect preliminary trimming of the leading chip-strip end if required. If photographic material is utilized identification and trimming of the chip-strip can be facilitated by forming the track 25 of translucent or transparent material and providing an illumination source within the base thereneath.

When the leading end of the chip-strip and the desired portion of the selected free support strip are properly aligned with respect to the indicated position on the tape deck, the tape applicator unit is moved downwardly and applies a splice to attach the end of the chip-strip to the support portion of the selected file-strip in the manner described above. It is again noted that pins 117 and 121 cooperate with the pins 124 and 125 to transversely align the strips prior to splice application.

When the leading end of the chip-strip has been secured to the file-strip, both strips are moved to selectively position the chip-strip with respect to blades 26 and 27. The actuator 28 is then pressed to segment the desired chip from the chip-strip and the file-strip and chip can then be moved back to the splicing deck to effect the attachment of the other chip end to the file-strip as shown in FIG. 12.

It will be appreciated that although the present invention has been described with respect to a multiple-strip information file, the chip-addition apparatus can also be used with single strip files, in which instance the separating mechanism would not be utilized.

The invention has been described in detail with particular reference to preferred embodiments thereof, but it will be understood that variations and modifications can be effected within the spirit and scope of the invention as described hereinabove and as defined in the appended claims.

We claim:

1. Apparatus for updating a strip-type information file including at least one strip having a support portion for receiving an information-bearing chip, said apparatus comprising:
    (a) first means for moving the one strip along a first path;
    (b) second means for moving a web of discrete information-bearing areas along a second path having at least one portion aligned with said first path, and into a predetermined location which is substantially superimposed over the support portion of the one strip;
    (c) means movable into contact with the web and the one strip at said predetermined location for attaching the leading portion of the web to the one strip; and
    (d) means located along said second path for transversely severing the web so as to separate at least one of the information-bearing areas from the web.

2. The invention as defined in claim 1 further comprising means located along said first path for separating other strips in said file from said one strip so as to expose the support portion thereof for chip addiiton.

3. The invention as defined in claim 1 further comprising means responsive to the movement of said attaching means for transversely aligning the one strip and the web for the attaching operation.

4. In an appaartus for updating an information file of superimposed strips and having means for adding information to a selected portion of the strips, a device for selectively separating from the file and directing to a location for information addition, a predetermined portion of one of the strips in the file, said device comprising:
    (a) means for moving the file along a path of travel; and (b) separating means movable across said path of travel for deflecting strips in the file away from the predetermined portion of the one selected strip.

5. The invention as defined in claim 4 wherein the strips are secured together at one end for movement as a unit and have the other ends arranged in a shingled array so that an end portion of each strip is exposed and wherein said device includes means for selectively positioning said array with respect to said separating means.

6. The invention as defined in claim 5 wherein said separating means includes:
(a) a first means for contacting the exposed portion of the strip in the file contiguous with the surface of the selected strip to be updated and for deflecting the contiguous strip away from the selected strip; and
(b) guide means for directing said selected strip to a location adjacent said information-adding means.

7. An apparatus for updating an information file of the type having a plurality of superimposed strips with portions of the strips at one end of the file arranged in a shingled array, comprising:
(a) a station for updating a surface of one of the strips;
(b) means for updating a portion of the strips located at said station;
(c) means for moving the file as a unit along a path;
(d) means for selectively separating a predetermined portion of one of the strips in the file from the remainder of the file and directing the selected strip to said station with the predetermined portion exposed for updating.

8. The invention as defined in claim 7 wherein said separating means includes:
(a) means for selectively positioning the array along said path; and
(b) means movable across said path for deflecting strips in the file away from the predetermined portion of the selected strip.

9. Apparatus for updating a strip-type information file including at least one strip having a support portion for receiving an information-bearing chip, said apparatus comprising:
first means for moving the one strip to a predetermined location;
second means for moving a web of discrete information-bearing areas to a position in which at least one of the information-bearing areas thereof is substantially superimposed over the support portion of the one strip;
means at said predetermined location for attaching the one information-bearing area to the one strip; and
means for transversely severing the web so as to separate the one information-bearing area from the web.

References Cited

UNITED STATES PATENTS

| | | | |
|---|---|---|---|
| 2,246,655 | 6/1941 | Bacon | 156—502X |
| 2,794,486 | 6/1957 | Plastaras et al. | 156—42.1 |

ROBERT F. STAHL, Primary Examiner